United States Patent [19]

Feldstein

[11] 4,052,911

[45] Oct. 11, 1977

[54] CABLE CORE CONDUIT

[75] Inventor: George Feldstein, Lansdale, Pa.

[73] Assignee: Incom International Inc., Pittsburgh, Pa.

[21] Appl. No.: 547,538

[22] Filed: Feb. 6, 1975

Related U.S. Application Data

[63] Continuation of Ser. No. 361,780, May 18, 1973, abandoned.

[51] Int. Cl.² .............................................. F16C 1/10
[52] U.S. Cl. .................................. 74/501 R; 74/501 P
[58] Field of Search ................. 74/471, 501 R, 501 P, 74/501.5, 502; 174/95, 97, 117 R, 48, 49; 64/3

[56] References Cited

U.S. PATENT DOCUMENTS

| 2,066,242 | 12/1936 | Abbott | 174/95 |
| 2,440,668 | 4/1948 | Tarbox | 174/95 |
| 2,585,054 | 2/1952 | Stachura | 174/95 X |

Primary Examiner—Samuel Scott
Assistant Examiner—Frank H. McKenzie, Jr.
Attorney, Agent, or Firm—James C. Wray

[57] ABSTRACT

A cable core conduit for a motion transmitting system comprising an outer casing of resilient plastic material, the casing having a central longitudinally extending cavity, the cavity separated by a resilient metallic strength member into a plurality of longitudinally extending pathways each of which are adapted to receive motion transmitting cable cores for slidable movement therein, the plastic walls of the cavity providing the bearing surfaces for the slidable cores.

10 Claims, 2 Drawing Figures

CABLE CORE CONDUIT

This is a continuation of application Ser. No. 361,780 filed May 18, 1973, now abandoned.

BACKGROUND OF THE INVENTION

This invention relates generally to cable conduits and in particular to cable core conduits adapted primarily for use in motion transmitting systems.

There are various forms of motion transmitting systems, and they may be utilized in various applications.

Generally there are two broad categories of cable type motion transmission systems. One form of system might be called a "push-pull" remote control system. That is, the cable core is both pushed and pulled to effect remote control of some servient mechanism, apparatus or device. In the pull mode the tension load is placed on the cable core and very little load is transmitted to the wall of the associated conduit. In the push mode the cable core is placed under a compressive load and a substantial lateral load is transmitted to the wall of the associated conduit. It can be seen therefore that the side walls of the cable conduit are subjected to intermittent loading depending upon the mode of operation.

Another basic form of cable type motion transmission system may be described as a "pull-pull" remote control system. The major difference between this system and the above referred to push-pull system is that in a pull-pull system the cable core is always under tension. That is, the cables are always in a pull mode to effect remote control of a servient mechanism, apparatus or device.

In both of the above forms of systems it is important that cable conduits provide the necessary support and bearing support for the cable core under many varying conditions.

The prior art is replete with many forms of conduits for cable cores for push-pull and pull-pull motion transmission systems. The prior art may be described as highly complex, difficult to manufacture and possessing poor performance characteristics.

A typical example of such prior art is U.S. Pat. No. 2,218,903 to O. J. Braty in which is disclosed a multiple Bowden Wire structure. The Braty structure is provided with a multiplicity of helically wound casings that provide the cable conduits for the various Bowden wires. The Braty Bowden wire conduit structure is highly complex and therefore difficult to manufacture. Additonally the Braty Bowden wire conduit fails to provide a suitable bearing surface for the movable wire dispersed therein. Any small imperfection on the inner surface of the conduit will cause a substantial "drag" on the wire as it moves over the imperfection resulting ultimately in a complete failure of the transmission system. The following prior art patents contain similar deficiencies in that they are complex, expensive to manufacture, are subject to premature wear and failure and provide a poor bearing surface for the slidable core or cable:

U.S. Pat. No. 2,186,181 to Steinlein; U.S. Pat. No. 2,774,382 to Bentley; U.S. Pat. No. 2,787,917 to Schroeder; U.S. Pat. No. 2,931,245 to Jacobson; U.S. Pat. No. 3,438,280 to McCabe; U.S. Pat. No. 3,439,555 to Rech; and U.S. Pat. No. 3,618,420 to Horwitt, et. al.

SUMMARY OF THE INVENTION

Accordingly it is a primary object of the present invention to provide a cable core conduit for a motion transmitting system comprising an outer casing of resilient plastic material, the casing having a central longitudinally extending cavity, the cavity separated by a resilient metallic strength member into a plurality of longitudinally extending pathways each of which are adapted to receive motion transmitting cable cores for slidable movement therein, the plastic walls of said cavity providing the bearing surfaces for said slidable cores.

It is yet another object of the present invention to provide a cable core conduit in which the resilient metallic strength has a vertical I-beam cross section.

It is still another object of the present invention to provide a cable core conduit in which the plastic material of the outer casing is polyethylene.

It is still aother object of the present invention to provide a cable core conduit in which the outer casing is extruded in an integral piece.

It is a further object of the present invention to provide a cable core conduit in which the resilient metallic strength member separates the cavity into two side-by-side longitudinally extending pathways.

It is yet a further object of the present invention to provide a cable conduit in which the surface of the resilient metallic strength is coated with a self-lubricating plastic.

It is a further object of the present invention to provide a cable conduit in which the self-lubricating plastic material is polytetrafluoroethylene.

It is still another object of the present invention to provide a cable conduit in which the resilient metallic strength member is formed as an integral resilient member.

It is a further object of the present invention to provide a cable conduit in which the resilient metallic strength member is formed in segments.

It is still another object of the present invention to provide an improved cable core conduit which can be manufactured using automated high volume techniques.

Other objects and advantages of the invention will become apparent as the present invention is better understood from the following disclosure and as shown in the accompanying drawings.

DESCRIPTION OF THE DRAWINGS

The accompanying drawings, referred herein and constituting a part hereof, illustrate an embodiment of the invention, and together with the description, serve to explain the principles of the invention.

In the drawings.

DETAILED DESCRIPTION OF THE INVENTION

Figure 1:
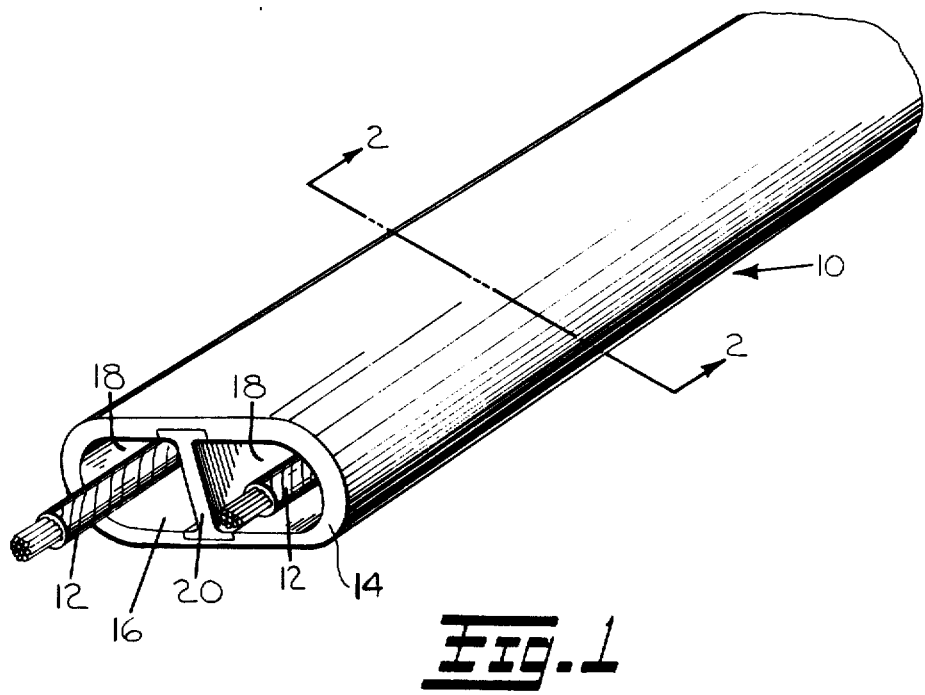
FIG. 1 is a fragmentary perspective view showing an improved cable conduit embodying the present invention.
Figure 2:
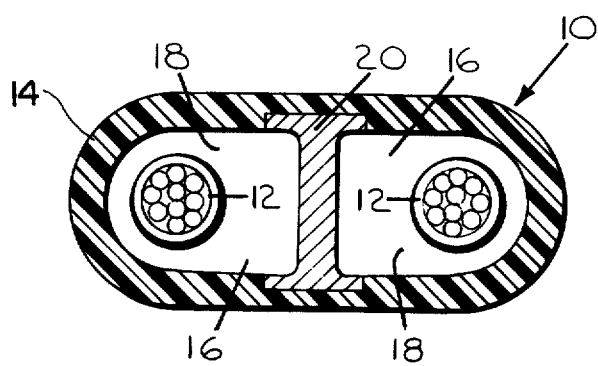
FIG. 2 is a sectional end view of the improved cable conduit of FIG. 1 taken along line 2—2.

Referring now to drawings and in particular to FIG. 1 and FIG. 2 there is shown an improved cable conduit 10 embodying the present invention.

The cable conduit 10 has disposed within two cable cores 12. The cable conduit 10 is adapted to comprise part of motion transmitting system (not shown). Coupling (not shown) or other suitable end fittings could be appropriately attached to the cable conduit 10. These end fittings could be threaded or otherwise provided with attaching means to operably attach the cable conduit 10 to one or more mechanisms such as a marine steering head and a marine tiller apparatus. The steering head could be operably attached to the cable cores 12 to remotely operate the marine tiller apparatus which could also be operably attached to the cores 12. The overall steering system could be configured in a push-pull mode or configured in a pull-pull mode. This will depend upon many various design parameters such as length of distance between the steering head and the tiller, the forces involved, and the like.

The cable core conduit 10 includes an outer casing 14. The outer casing could be manufactured from a wide range of resilient plastic materials. A preferred material for the outer casing 14 is polyethylene plastic. This plastic material, i.e. polyethylene, has highly desirable characteristics, from both a production and preformance point of view.

From a production point of view a polythylene casing 14 could be easily extruded into such a shape to accommodate various forms of strength members. Additonally the extruding mechanism (now shown) could be adapted to extrude the casing 14 on a continuous basis encapsulating the strength member.

From a performance point of view a polyethylene casing 14 would provide a low friction bearing surface for the slidable movement of the cable cores 12. Additionally, because of its resilient nature the casing can accommodate irregular surfaces without obstructing the movement of the cores 12.

The outer casing 14 is provided with a centrally disposed longitudinally extending cavity 16. The cavity 16, runs the entire length of the casing and provides in part the bearing surface for the slidable movement of the cable cores 12.

The cavity 16 may be separated into a plurality of longitudinally extending pathways 18 by a strength member 20.

Each of the pathways 18 are adapted to receive, for slidable movement therein, a motion transmitting cable core 12. The cable cores 12 may be one of various types of cable cores such as the Bowden wire type or the type of cable core disclosed U.S. Pat. No. 3,525,996 to B. H. Moore.

Preferably the cavity 16 could be separated into two side-by-side longitudinally extending pathways 18 by a single strength member 20.

The strength member 20 may be manufactured from a resilient metallic material such as from a stainless steel ribbon material or the like. Depending upon application and environment the resilient metallic strength member 20 could be a single integral member or could be provided in segments. The segments of the strength member 20 would be placed in the cavity 16 in an in-line fashion.

The strength member 20 could be formed with an "I-beam" cross section to provide the necessary strength to the cable conduit 10. With such a strength member 20 the cable conduit 10 will be adaptable for utilization in either a push-pull mode or a pull-pull mode.

To increase the overall bearing characteristics of the cable conduit assembly, the exposed surfaces of the strength member could be coated with a self-lubricating plastic. The self-lubricating plastic would further reduce any friction encountered by the cable core 12 during its slidable movement. The self-lubricating plastic coating could include polytetrafluoroethylene.

In the typical configuration the resilient metallic strength member 20 separates the longitudinally extending cavity throughout the length of the cavity.

Various modifications of the bearing of the invention may be made without departing from the spirit or scope thereof and it is to be understood that the invention is to be limited only as defined in the appended claims.

I claim:

1. A push-pull cable core conduit for a motion transmitting system comprising an outer casing of resilient plastic material having an inner plastic wall, said casing having a central longitudinally extending cavity, said cavity separated by a resilient metallic strength member into a plurality of longitudinally extending pathways each of which pathways are bounded by portions of the metallic strength member and the inner plastic wall, a like plurality of motion transmitting cable cores positioned severally in the pathways and spaced from the resilient metallic strength member and from the plastic wall of the outer casing for slidable movement therein, said inner plastic wall of said outer casing providing the bearing surfaces for said slidable cores.

2. A calbe core conduit in accordance with claim 1 wherein said resilient metallic strength has a vertical I-beam cross section with edges embedded in the outer casing.

3. A cable core conduit in accordance with claim 2 wherein said plastic material of said outer casing is polyethylene.

4. A cable core conduit in accordance with claim 3 wherein said outer casing is extruded in an integral piece.

5. A cable core conduit in accordance with claim 1 wherein said resilient metallic strength member separates said cavity into two side-by-side longitudinally extending pathways.

6. A cable conduit in accordance with claim 2 wherein the surface of said resilient metallic strength member is coated with a self-lubricating plastic.

7. A cable conduit in accordance with claim 6 wherein said self-lubricating plastic material is polytetrafluoroethylene.

8. A cable conduit in accordance with claim 2 wherein said resilient metallic strength member is formed as an integral resilient member.

9. A cable conduit in accordance with claim 2 wherein said resilient metallic strength member is formed in segments.

10. A push-pull cable core conduit for a motion transmitting system comprising an outer casing of resilient plastic material, said casing having a central longitudinally extending cavity, said cavity separated by a resilient metallic strength member into a plurality of longitudinally extending pathways each of which are adapted to receive motion transmitting cable cores for slidable movement therein, said plastic walls of said cavity providing the bearing surfaces for said slidable cores, said resilient metallic strength has a vertical I-beam cross section, said outer casing is extruded in an integral piece, said resilient metallic strength member separates said cavity into two side-by-side longitudinally extending pathways.

* * * * *